United States Patent [19]

O'Brien, Jr.

[11] Patent Number: 5,757,675
[45] Date of Patent: May 26, 1998

[54] WORKPLACE LAYOUT METHOD USING CONVEX POLYGON ENVELOPE

[75] Inventor: Francis J. O'Brien, Jr., Newport, R.I.

[73] Assignee: The United States of America as represented by the Secretary of the Navy, Washington, D.C.

[21] Appl. No.: 708,008

[22] Filed: Aug. 27, 1996

[51] Int. Cl.$^6$ .................................................. G06F 15/00
[52] U.S. Cl. ............................... 364/564; 705/7; 705/8; 364/512
[58] Field of Search ........................... 364/564, 400, 364/401, 402, 512; 705/7, 8

[56] References Cited

U.S. PATENT DOCUMENTS 5,235,506  8/1993  O'Brien, Jr. ........................ 364/400
5,402,335  3/1995  O'Brien ............................ 364/401

OTHER PUBLICATIONS

Chang et al., "Dynamic Algorithms in Computational Geometry", IEEE, Sep. 1992.

*Primary Examiner*—James P. Trammell
*Assistant Examiner*—Patrick Assouad
*Attorney, Agent, or Firm*—Michael J. McGowan; Robert W. Gauthier; Prithvi C. Lall

[57] ABSTRACT

An improved method for laying out a workspace using the prior art crowding index, PDI, where the average interpoint distance between the personnel and/or equipment to be laid out, $\bar{d}_{acr}$ can be determined. The improvement lies in using the convex hull area, $A_{poly}$, of the distribution of points being laid out within the workplace space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem with additional methods using the Surveyor's Area formula and Hero's formula also being described for calculating $A_{poly}$. The improved crowding index is termed $PDI_{poly}$ to distinguish it from the prior art crowding index, $PDI_{acr}$.

10 Claims, 1 Drawing Sheet

WORKPLACE LAYOUT METHOD USING CONVEX POLYGON ENVELOPE

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This patent application is co-pending with a related patent application entitled Approximation Method for Workplace Layout Using Convex Polygon Envelope (Navy Case No. 77891) by the same inventor as this patent application.

BACKGROUND OF THE INVENTION

(1) Field of the Invention

This invention relates to a method for providing layouts of workplaces and more particularly to a generalized layout method for a workplace containing any number of spatial objects based on a crowding index calculated from a convex polygon envelope.

(2) Description of the Prior Art

In the inventor's previous patent entitled "Process Which Aids to the Laying Out of Locations of a Limited Number of 100, Personnel and Equipments in Functional Organization", U.S. Pat. No. 5,235,506, which is incorporated into this disclosure in its entirety by reference, a process is described whereby the relationship among objects in a particular space can be accurately determined to minimize crowding. A crowding index, or Population Density Index (PDI), for the space, termed $PDI_{act}$, is calculated and compared to theoretical minimum ($PDI_{min}$) and maximum ($PDI_{max}$) values, such that $PDI_{min} < PDI_{act} < PDI_{max}$. The formula for calculating $PDI_{act}$ is as follows:

$$PDI_{act} = \frac{1}{\bar{d}_{act}} \sqrt{\frac{n}{A}} \quad (1)$$

where n=number of objects in the space;

A=the geometric area of the space; and $\bar{d}_{act}$=average Euclidean distance among all possible pairs of n objects within the space.

The values of $PD_{min}$ and $PDI_{max}$ are given as follows:

$$PDI_{min} = \frac{1n}{\bar{\Delta}A} \quad (2)$$

and $$PDI_{max} = \frac{1}{c\bar{\Delta}} \sqrt{\frac{n}{A}} \quad (3)$$

where $\bar{\Delta}$=the average Euclidean distance of all possible pairs of points for a unit lattice, i.e., a lattice of n points uniformly distributed in area A; and c=an arbitrary constant which corresponds to the minimum possible spacing between the objects, e.g., personnel standing shoulder to shoulder within a space would be spaced approximately one foot from head to head, so c would be equal to one foot.

It can be seen that $PDI_{min}$ corresponds to a uniform distribution of n points in the space, while $PDI_{max}$ corresponds to a uniform distribution of n points in the space with a minimum distance c between each horizontal and vertical point.

For small workplace layouts, i.e., where the number of points do not exceed 100, a table of values for $\bar{\Delta}$ is provided:

TABLE 1

EUCLIDEAN DISTANCE VALUES FOR SELECTED UNIT LATTICES (IN FT)

| Lattice (n = Area) | $\bar{\Delta}$ | Lattice (n = Area) | $\bar{\Delta}$ |
| --- | --- | --- | --- |
| 2 × 1 | 1.00 | 7 × 4 | 2.97 |
| 2 × 2 | 1.14 | 7 × 5 | 3.19 |
| 3 × 1 | 1.00 | 7 × 6 | 3.43 |
| 3 × 2 | 1.42 | 7 × 7 | 3.68 |
| 3 × 3 | 1.63 | 8 × 2 | 2.97 |
| 4 × 2 | 1.71 | 8 × 3 | 3.09 |
| 4 × 3 | 1.90 | 8 × 8 | 4.20 |
| 4 × 4 | 2.14 | 9 × 2 | 3.29 |
| 5 × 2 | 2.01 | 9 × 3 | 3.41 |
| 5 × 3 | 2.19 | 9 × 9 | 4.72 |
| 5 × 4 | 2.41 | 10 × 2 | 3.62 |
| 5 × 5 | 2.65 | 10 × 3 | 3.72 |
| 6 × 2 | 2.32 | 10 × 4 | 3.88 |
| 6 × 3 | 2.48 | 10 × 5 | 4.07 |
| 6 × 4 | 2.69 | 10 × 6 | 4.27 |
| 6 × 5 | 2.92 | 10 × 7 | 4.50 |
| 6 × 6 | 3.18 | 10 × 8 | 4.74 |
| 7 × 2 | 2.65 | 10 × 9 | 4.98 |
| 7 × 3 | 2.78 | 10 × 10 | 5.24 |

In the inventor's related patent entitled "Two-Step Method Constructing Large-Area Facilities and Small-Area Intrafacilities Equipments Optimized by User Population Density", U.S. Pat. No. 5,402,335, the following formula was provided for calculating $\bar{\Delta}$ for any number of points:

$$\bar{\Delta} = \frac{C\sum_{i=1}^{R-1}(R-i)i + R\sum_{j=1}^{C-1}(C-j)j + 2\sum_{i=1}^{R-1}\sum_{j=1}^{C-1}(R-i)(C-j)\sqrt{i^2+j^2}}{(RC)(RC-1)/2} \quad (4)$$

where

C=the number of vertical points in each column of the unit lattice; and

R=the number of horizontal points in each row of the unit lattice, such that RC=the total number of points in the unit lattice.

The formula provides an exact solution for $\bar{\Delta}$, corresponding to the values given in Table 1.

As an example of using PDI to determine the crowding of a particular layout, assume a workspace of 25 ft² (A=25) with a total of 12 objects or personnel (n=12) which need to be laid out within the space. In using Table 1 or equation (4), the row by column distribution of the lattice points should be commensurate with the shape of the region A in which the lattice points reside. If the area is relatively square, i.e., 5×5, a corresponding distribution of 12 points would be 4×3, with $\bar{\Delta}=1.90$. For a rectangular area of approximately 8.33×3, a corresponding distribution would be 6×2, with $\bar{\Delta}=2.32$. Assuming a relatively square area and a 4×3 distribution, the calculation of $PDI_{min}$ from equation (2) yields $(1/1.90)(12/25) \equiv 0.25$ and the calculation of $PDI_{max}$ from equation (3) yields $(1/c)(1/1.90)(12/25)^{1/2} \equiv 0.36$, where c is taken as one foot as in the example of personnel standing shoulder to shoulder. Note that the value of $PDI_{max}$ is seen to increase as c, or the minimum distance between points, becomes smaller, corresponding to the ability to pack additional points into the space. To determine $PDI_{act}$, measurements of the proposed distribution of points need to be taken and those measurements used to calculate $\bar{d}_{act}$ as follows:

$$\bar{d}_{act} = \frac{2 \sum_{i<j} d_{ij}}{n(n-1)} \qquad (5)$$

where $d_{ij}$=measured distance between point i and point j. Assuming a proposed distribution where $\bar{d}_{act}$=2.30, $PDI_{act}$ from equation (1) yields $(1/2.30)(12/25)^{1/2} \cong 0.30$. This would indicate the space is 20% more crowded (0.25 vs. 0.30) than the theoretical minimum and 20% less crowded than the theoretical maximum (0.30 vs. 0.36).

It will be noticed that the total area, A, of the space is used in computing $PDI_{act}$, or the crowding index of the space. In actuality, the perceived crowding will depend on the area encompassed by the points (objects or personnel) within the space. As an example, assume four points arranged in a square having sides approximately 4.4 units long. For such an arrangement, $\bar{d}_{act}$, as calculated in accordance with equation (5), is $2(d_{12}+d_{13}+d_{14}+d_{23}+d_{24}+d_{34})/(4(4-1))=5.0$. This can be compared to a rectangular arrangement having sides of 2.5 and 6 units long. Again $\bar{d}_{act}$ is calculated to be 5.0. For a 2×2 distribution, we obtain $\bar{A}$=1.14 from Table 1. If we now assume an area of A=100 for both distributions and c=1, we can calculate $PDI_{min}$, $PDI_{max}$ and $PDI_{act}$ from equations (2), (3) and (1), respectively.

$PDI_{min}=(1/1.14)(4/100)=0.035$ $PDI_{max}=(1/1)(1/1.14)(4/100)^{1/2}=0.175$ $PDI_{act}=(1/5)(4/80)^{1/2}=0.040$ Note that the various PDI's, or the crowding indices, have the same values for both the square and rectangular distributions of points. However, the perceived crowding of personnel separated by 2.5 units, which is approaching the minimum spacing of c=1, would probably be greater than those separated by 4.4 units. Carrying the example to its extreme, a long, narrow rectangle can be formed where the two points forming the shorter side of the rectangle are at the minimum spacing "c". Again, the PDI values would remain the same, but the crowding at the ends of the rectangle would probably be intolerable.

SUMMARY OF THE INVENTION

Accordingly, it is a general purpose and object of the present invention to provide an improvement to the PDI method for laying out workplaces which better takes into account the distribution of points within an area.

It is a further object of the present invention that the improvement better reflect the perceived crowding within the point distribution.

These objects are provided with the present invention by an improved method of calculating the crowding index for a space, $PDI_{act}$, which accounts for the distribution of points within the space. While the term $\bar{d}_{act}$ attempts to account for the spacing between points, it is to be noted in the example given above that the change from a square distribution of points to a rectangular distribution had no effect on the crowding indices. However, with $\bar{d}_{act}$ held constant, there is a change in the area bounded by the points as the distribution moves from a square configuration ($A_{square}$=4.4×4.4=19.36) to a rectangular one ($A_{rect}$=2.5×6=15). The decrease in area is consistent with an increase in the perceived crowding. It is proposed that a more accurate measure of the actual crowding index will utilize a measure of the actual polygonal space occupied by the distribution of points within the total area as well as the average Euclidean distance, $\bar{d}_{act}$ between the points for which a layout is desired. This new measure can be expressed as follows:

$$PDI_{poly} = \frac{1}{\bar{d}_{act}} \sqrt{\frac{n}{A_{poly}}} \qquad (6)$$

where $A_{poly}$ the area of the polygonal space occupied by the distribution.

The method of the present invention further provides for the calculation of $A_{poly}$ based on the use of Pick's theorem, as further developed herein.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
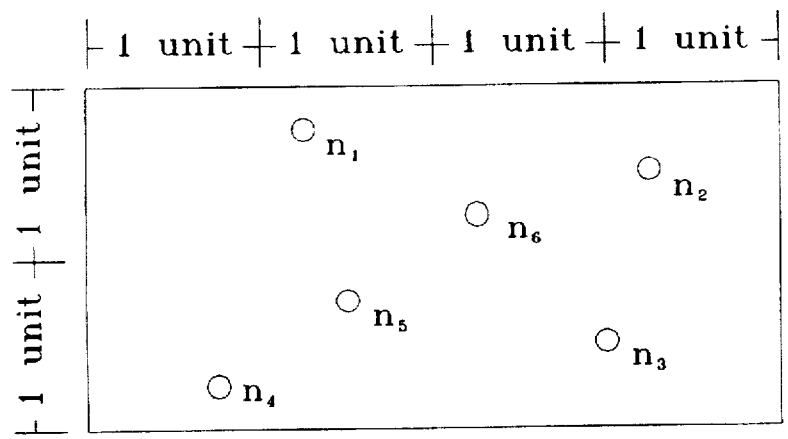
FIG. 1 depicts an area A of 2×4 units with n=6 points distributed therein.
Figure 2:
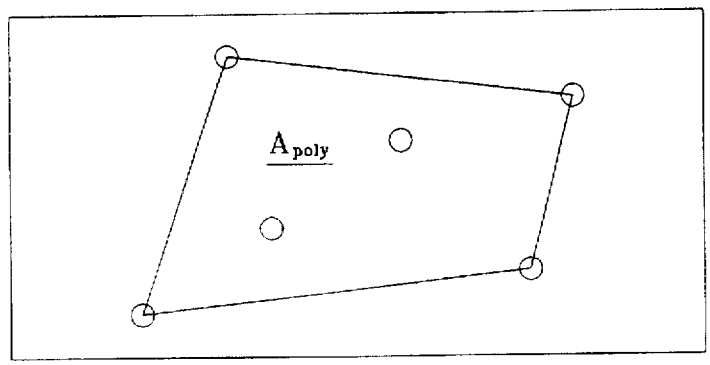
FIG. 2 depicts a polygonal area containing the distributed points.

Referring now to FIG. 1, there is shown a configuration of 6 points, denoted $n_1$ through $n_6$, arranged in a space of 8 square units. In using the improved PDI method, the values for $PDI_{min}$ and $PDI_{max}$ are computed in accordance with the prior art. Using Table 1 or equation (4), a 3×2 lattice is chosen, yielding a $\bar{A}$ of 1.42. Assuming a minimum distance between objects of c=0.75, equations (2) and (3) yield values of 0.528 and 0.813 for $PDI_{min}$ and $PDI_{max}$, respectively. The average Euclidean distance between points $\bar{d}_{act}$ is also determined in the conventional manner, i.e., by measurements taken from time-lapse observations. Using the distribution shown in FIG. 1, $\bar{d}_{act} \cong 1.54$. To determine $PDI_{act}$ in the conventional manner, we use equation (1) with A=8. $PDI_{act}$ is then determined to be $\cong 0.562$. A $PDI_{act}$ just slightly higher than $PDI_{min}$ would indicate a non-crowded layout. Referring now to FIG. 2, the area to be used in calculating the improved crowding index, $PDI_{poly}$, in accordance with the present invention is depicted therein. The polygonal area $A_{poly}$, is referred to as a convex hull and is constructed as described in *Computational Geometry: An Introduction*, Preparata, F. P. and Shamos, M. I. (1985, pp. 104–106) New York: Springer-Verlag. Intuitively, the convex hull is constructed by imagining a rubber band stretched around all the points and, when released, the band assumes the shape of the hull. If the points are then connected pairwise, no line falls outside the bounded figure. A number of methods, well known in the art, are available for calculating the convex hull area. In a previous paper, "Measuring The Areal Density Of A Finite Ensemble", *Perceptual and Motor Skills*, O'Brien, F. (1995, vol. 81, pp. 195–200), the inventor discusses three such methods: (1) Pick's theorem; (2) the Surveyor's Area formula; and (3) Hero's formula. Pick's theorem will be used to illustrate the calculation of the area of the convex hull, $A_{poly}$, which will then be used in determining the improved crowding index, $PDI_{poly}$.

Figure 3:
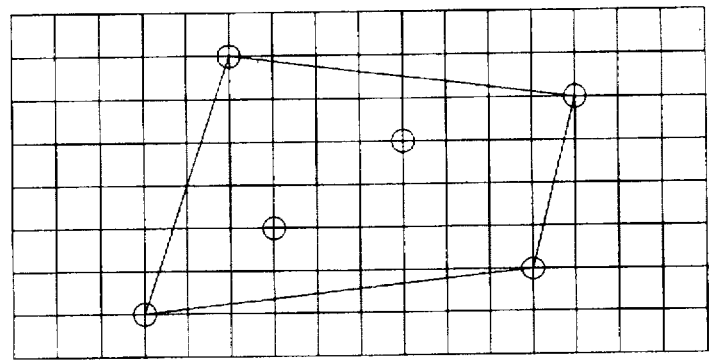
FIG. 3 depicts a lattice overlaid on the polygonal area.

Referring now to FIG. 3, the convex hull is shown overlaid with a square lattice of points such that each vertex of the hull meets a point of the lattice. It is anticipated the spacing between lattice points will be determined by overlaying the convex hull with lattices having successively smaller and smaller spacing. The process is continued until the lattice spacing is such that each vertex of the convex hull falls on a lattice point. Pick's theorem states:

$$A_{poly} = r^2 (i + b/2 - 1) \qquad (7)$$

where r=the spacing between lattice points;

i=the number of lattice points in the interior of the hull; and b=the number of lattice points on the boundary.

FIG. 3 shows a lattice with r=0.25. Counting the number of lattice points on the interior of the convex hull yields i=41 and the number of lattice points on the boundary gives b=5. $A_{poly}$ from equation (7) is $(0.25)^2(41+5/2-1)=2.66$. Using this value in equation (6) yields a value of 0.98 for $PDI_{poly}$. Since $PDI_{poly} > PDI_{max}$, a crowded condition is indicated. Looking to FIG. 3, we can see the points are tightly grouped in the center of the rectangular area. The prior art crowding index, $PDI_{acr}$ accounted for the spacing of points within the group through the term $\bar{d}_{acr}$. However, the fact that the point distribution occupies only a relatively small area ($A_{poly}$= 2.66) within the total area (A=8.0) has no influence on the prior art crowding index. As indicated in the above calculation, the use of the convex hull area term $A_{poly}$ provides a new crowding index, $PDI_{poly}$, which takes the actual area occupied by the distribution into account. The spacing of points within the group is accounted for in the term $\bar{d}_{act}$ when calculating $PDI_{poly}$, in the same manner as in calculating $PDI_{act}$. In the example given above, the new crowding index is found to be not only greater than the prior art crowding index, but also greater than $PDI_{max}$, indicating the tight grouping of points does not make for the most efficient use of the total area A. Another way of looking at this result is to note that $PDI_{poly}'$ is independent of the area A being laid out. Changes in the total area A effect $PDI_{min}$ and $PDI_{max}$, or the bounds of $PDI_{poly}'$, but the crowding index within the convex hull area is not effected by the changes to the total area A.

What has thus been described is an improvement to the prior art crowding index, or PDI, method for laying out workspace where the average interpoint distance between the personnel and/or equipment to be laid out, $\bar{d}_{acr}$ can be determined. The improvement lies in using the convex hull area, $A_{poly}$, of the distribution of points being laid out within the space to calculate the actual crowding index for the workspace. The convex hull area is that area having a boundary line connecting pairs of points being laid out such that no line connecting any pair of points crosses the boundary line. The calculation of the convex hull area is illustrated using Pick's theorem. The improved crowding index is termed $PDI_{poly}$, to distinguish it from the prior art crowding index, $PDI_{acr}$. In the prior art, the distribution of points within the workplace was taken into account in the crowding index, $PDI_{acr}$, solely through the average interpoint distance term $\bar{d}_{acr}$. The use of the area bounded by the personnel or equipment being laid out in determining the improved crowding index, $PDI_{poly}$, more fully takes into account the distribution of points within the total area being laid out and also better reflects the perceived crowding within the point distribution.

While a preferred embodiment of the invention using Pick's theorem has been disclosed in detail, it should be understood by those skilled in the art that various other methods or formulae for calculating the convex hull area, $A_{poly}$, may be used. For example, the convex hull area may be calculated using the Surveyor's Area formula or Hero's formula.

When Cartesian coordinates are readily available for the points forming the vertices of the convex hull, the Surveyor's Area formula may be used:

$$A_{poly} = \frac{1}{2}|(x_1y_2 - x_2y_1) + (x_2y_3 - x_3y_2) + \ldots + (x_sy_1 - x_1y_s)| \qquad (8)$$

where $|\cdot|$ indicates the absolute value and $\{(x_1,y_1), \ldots, (x_s,y_s)\}$ are the Cartesian coordinates of the s boundary points of the convex hull. When coordinate measurements are not easily available, but one is able to obtain the distances between the vertices of the convex hull, such as from an aerial photograph, then Hero's formula may be used. Hero's formula is based on summing the areas of non-overlapping triangles within the convex hull. The area of each triangle is calculated from:

$$K = \sqrt{C_p(C_p - S_1)(C_p - S_2)(C_p - S_3)} \qquad (9)$$

where $S_1$, $S_2$ and $S_3$ are the lengths of the sides of triangle and $C_p$ is the semiperimeter of the triangle, or $(S_1+S_2+S_3)/2$. In general, s-2 triangles will result from a convex hull consisting of s boundary points. The total area of the convex hull is then given as:

$$A_{poly} = \sum_{j=1}^{s-2} K_j \qquad (10)$$

As with the use of Pick's theorem to calculate $A_{poly}$, the Surveyor's Area formula and Hero's formula are well known in the art.

In light of the above, it is therefore understood that within the scope of the appended claims, the invention may be practiced otherwise than as specifically described.

What is claimed is:

1. An improved method of determining a population density index which aids in laying out the locations of any number of objects in a quadrilateral space where an exact average Euclidean distance between pairs of objects can be determined, the improved method comprising the steps of:

distributing the objects in the space;

determining a convex hull area for the distribution of the objects, the convex hull area being bounded by a boundary line connecting pairs of objects such that no line connecting any pair of objects crosses the boundary line;

determining the population density index for the space and the distribution of objects by the relationship $$PDI_{poly} = \frac{1}{\bar{d}_{act}} \sqrt{\frac{n}{A_{poly}}}$$

where $\bar{d}_{act}$ is the average Euclidean distance between pairs of objects, n is the number of objects and $A_{poly}$ is the convex hull area; and optimizing the layout of the objects in the space based on the population density index.

2. An improved method of determining a population density index which aids in laying out the locations of any number of objects in a quadrilateral space where an exact average Euclidean distance between pairs of objects can be determined, the improved method comprising the steps of:

distributing the objects in the space;

overlaying the space with a Cartesian coordinate system having an arbitrary origin;

locating a first object having the minimum X coordinate and establishing the first object as a prime object;

locating a next object by extending a vertical line from the prime object and rotating the vertical line in a clockwise manner about the prime object, the next object being that object first encountered by the vertical line;

extending a boundary line section between the prime object and the next object;

establishing the next object as the prime object;

locating a next object by extending a sweep line from the prime object in the direction of the boundary line section and rotating the sweep line in a clockwise manner about the prime object, the next object being that object first encountered by the sweep line;

repeating the steps beginning with the step of extending a boundary line section until the boundary line is extended to the first point, forming a closed convex hull;

determining the population density index for the space and the distribution of objects by the relationship $$PDI_{poly} = \frac{1}{\bar{d}_{act}} \sqrt{\frac{n}{A_{poly}}}$$

where $\bar{d}_{act}$ is the average Euclidean distance between pairs of objects, n is the number of objects and $A_{poly}$ is the convex hull area; and optimizing the layout of the objects in the space based on the population density index.

3. The improved method of claim 1 wherein the convex hull determining step further comprises the steps of:

overlaying the convex hull area with progressively smaller square lattices until each vertex of the convex hull meets a point on the lattice;

counting the number of lattice points in the interior of the convex hull;

counting the number of lattice points on the boundary line of the convex hull; and determining the convex hull area by the relationship $$A_{poly} = r^2 (i + b/2 - 1)$$

where r is the spacing between lattice points, i is the number of lattice points in the interior of the hull and b is the number of lattice points on the boundary line.

4. The improved method of claim 2 wherein the convex hull determining step further comprises the steps of:

overlaying the convex hull area with progressively smaller square lattices until each vertex of the convex hull meets a point on the lattice;

counting the number of lattice points in the interior of the convex hull;

counting the number of lattice points on the boundary line of the convex hull; and determining the convex hull area by the relationship $$A_{poly} = r^2 (i + b/2 - 1)$$

where r is the spacing between lattice points, i is the number of lattice points in the interior of the hull and b is the number of lattice points on the boundary line.

5. The improved method of claim 1 wherein the convex hull determining step further comprises the steps of:

overlaying the convex hull with a Cartesian coordinate system;

determining coordinates for the objects lying on the boundary line of the convex hull; and determining the convex hull area from the relationship $$A_{poly} = \tfrac{1}{2}|(x_1y_2 - x_2y_1) + (x_2y_3 - x_3y_2) + \ldots + (x_sy_1 - x_1y_s)|$$

where |·| indicates the absolute value and $\{(x_1y_1), \ldots (x_s,y_s)\}$ are the Cartesian coordinates of the objects lying on the boundary line, the number of objects lying on the boundary line being designated s.

6. The improved method of claim 2 wherein the convex hull determining step further comprises the steps of:

overlaying the convex hull with a Cartesian coordinate system;

determining coordinates for the objects lying on the boundary line of the convex hull; and determining the convex hull area from the relationship $$A_{poly} = \tfrac{1}{2}|(x_1y_2 - x_2y_1) + (x_2y_3 - x_3y_2) + \ldots + (x_sy_1 - x_1y_s)|$$

where |·| indicates the absolute value and $\{(x_1y_1), \ldots (x_s,y_s)\}$ are the Cartesian coordinates of the objects lying on the boundary line, the number of objects lying on the boundary line being designated s.

7. The improved method of claim 1 wherein the convex hull determining step further comprises the steps of:

extending side lines connecting pairs of objects lying on the boundary line to form non-overlapping triangles within the convex hull;

summing the area of the triangles to determine the total convex hull area.

8. The improved method of claim 7 wherein the area summing step further comprises the steps of:

measuring the lengths of the side lines of each triangle;

determining a semiperimeter, $C_p$, for each triangle equal to one half of the sum of the lengths of the side lines for the triangle; and determining an area for each triangle from the relationship $$K = \sqrt{C_p(C_p - S_1)(C_p - S_2)(C_p - S_3)}$$

where $S_1$, $S_2$ and $S_3$ are the lengths of the side lines of the triangle.

9. The improved method of claim 2 wherein the convex hull determining step further comprises the steps of:

extending side lines connecting pairs of objects lying on the boundary line to form non-overlapping triangles within the convex hull; and summing the area of the triangles to determine the total convex hull area.

10. The improved method of claim 9 wherein the area summing step further comprises the steps of:

measuring the lengths of the side lines of each triangle;

determining a semiperimeter, $C_p$, for each triangle equal to one half of the sum of the lengths of the side lines for the triangle; and determining an area for each triangle from the relationship $$K = \sqrt{C_p(C_p - S_1)(C_p - S_2)(C_p - S_3)}$$

where $S_1$, $S_2$ and $S_3$ are the lengths of the side lines of the triangle.

* * * * *